United States Patent
Stevanovic

(10) Patent No.: US 8,561,412 B2
(45) Date of Patent: *Oct. 22, 2013

(54) METHOD AND DEVICE FOR CONVERTING THERMAL ENERGY FROM BIOMASS INTO MECHANICAL WORK

(75) Inventor: Dragan Stevanovic, Sulzbach-Rosenberg (DE)

(73) Assignee: Krones AG (DE)

( * ) Notice: Subject to any disclaimer, the term of this patent is extended or adjusted under 35 U.S.C. 154(b) by 0 days.

This patent is subject to a terminal disclaimer.

(21) Appl. No.: 13/390,487

(22) PCT Filed: Aug. 12, 2010

(86) PCT No.: PCT/EP2010/061754
§ 371 (c)(1), (2), (4) Date: Feb. 14, 2012

(87) PCT Pub. No.: WO2011/020768
PCT Pub. Date: Feb. 24, 2011

(65) Prior Publication Data
US 2012/0137701 A1    Jun. 7, 2012

(30) Foreign Application Priority Data
Aug. 21, 2009   (DE) .......................... 10 2009 038 322

(51) Int. Cl.
*F02C 6/18*    (2006.01)
(52) U.S. Cl.
USPC .......................................... 60/781
(58) Field of Classification Search
USPC ........................................ 60/39.12, 780, 781
See application file for complete search history.

(56) References Cited

U.S. PATENT DOCUMENTS

| | | | | |
|---|---|---|---|---|
| 4,058,974 A | * | 11/1977 | Pfenninger | 60/39.12 |
| 4,667,467 A | * | 5/1987 | Archer et al. | 60/781 |
| 5,069,685 A | * | 12/1991 | Bissett et al. | 48/77 |
| 5,643,354 A | * | 7/1997 | Agrawal et al. | 75/490 |
| 5,706,645 A | | 1/1998 | Mollot et al. | 60/776 |
| 6,032,456 A | | 3/2000 | Easom et al. | 60/39.2 |

(Continued)

FOREIGN PATENT DOCUMENTS

| | | | | |
|---|---|---|---|---|
| DE | 3931582 | 4/1991 | | F02C 7/08 |
| DE | 4236619 | 5/1994 | | F28D 17/00 |

(Continued)

OTHER PUBLICATIONS

International Search Report issued in PCT/EP2010/061754 (with translation) dated Oct. 28, 2010 (6 pgs).

(Continued)

*Primary Examiner* — Phutthiwat Wongwian
(74) *Attorney, Agent, or Firm* — Hayes Soloway P.C.

(57) ABSTRACT

A method is provided for converting thermal energy from carbonaceous raw materials into mechanical work, having at least one first and one second device for storing and releasing thermal energy connected to least intermittently alternatively in a turbine branch having a gas turbine connected downstream thereof. The method includes the steps of: a) combusting a gas in a gas combustor; b) passing the exhaust gases arising in the gas combustor through a device for storing thermal energy; and c) feeding the hot air released by the one device into the gas turbine, wherein the hot air released by the gas turbine is fed to at least one heat exchanger connected downstream of the gas turbine.

17 Claims, 2 Drawing Sheets

(56) References Cited

U.S. PATENT DOCUMENTS

Figure 1:
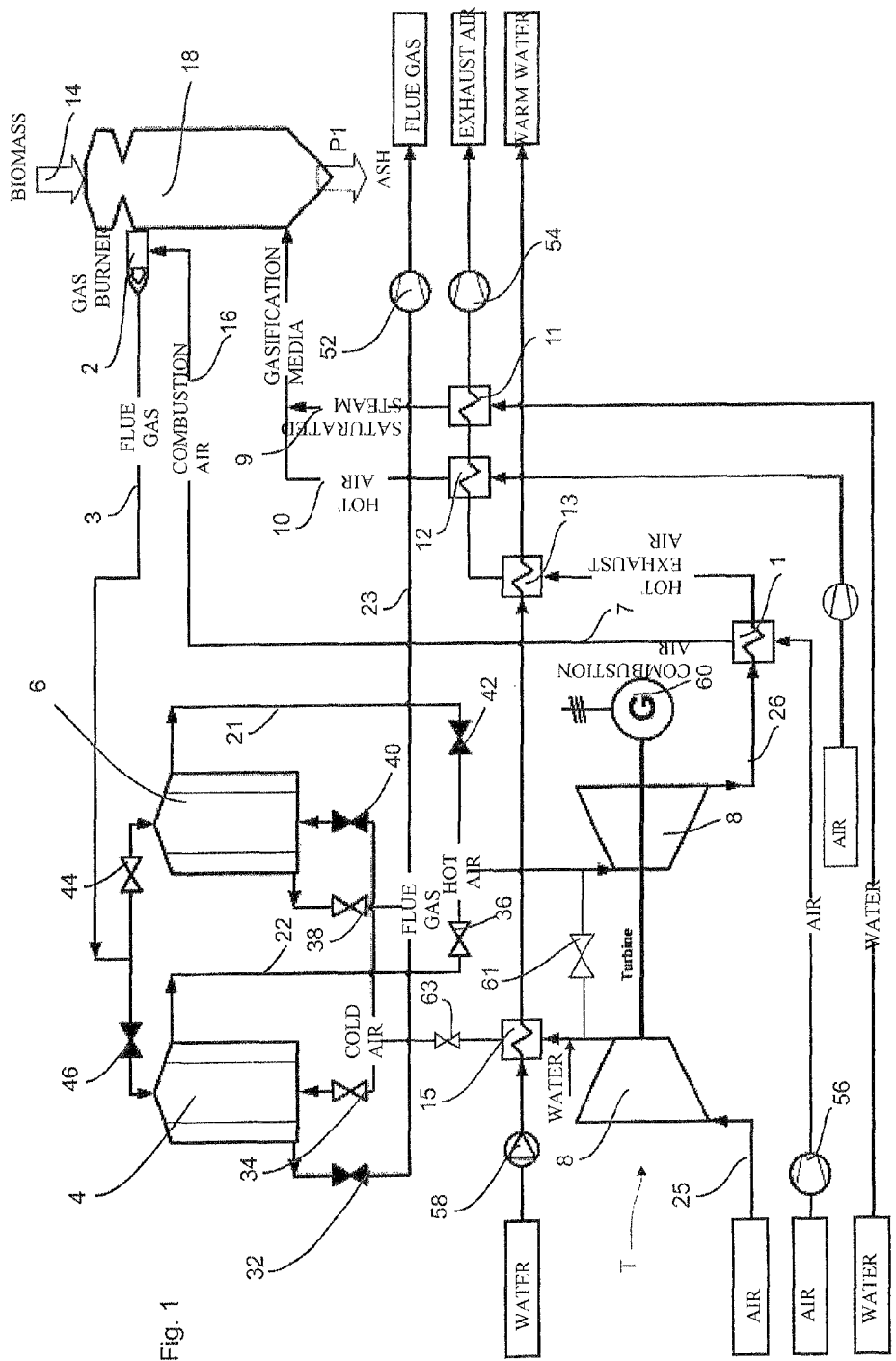

| | | | | |
|---|---|---|---|---|
| 6,247,301 | B1* | 6/2001 | Brannstrom et al. | 60/39.12 |
| 6,430,915 | B1* | 8/2002 | Wiant et al. | 60/39.12 |
| 6,799,425 | B2* | 10/2004 | Emmel et al. | 60/659 |
| 2003/0106266 | A1 | 6/2003 | Bryan et al. | 48/197 |
| 2004/0088980 | A1 | 5/2004 | Emmel et al. | 60/645 |
| 2011/0035990 | A1* | 2/2011 | Kammerloher et al. | 44/311 |

FOREIGN PATENT DOCUMENTS

| | | | |
|---|---|---|---|
| DE | 4342165 | 5/1995 | C10B 53/02 |
| DE | 4342165 | 11/1995 | C10B 53/02 |
| DE | 10039246 | 2/2002 | F02C 3/20 |
| DE | 10227074 | 1/2004 | C10J 3/54 |
| DE | 202004017725 | 2/2005 | F01K 27/00 |
| DE | 202004017725 | 3/2005 | F01K 27/00 |
| EP | 0132452 | 2/1985 | F02C 7/10 |
| EP | 0620909 | 5/1996 | F28D 17/00 |
| GB | 1502887 | 3/1978 | F02C 7/08 |
| WO | WO 9324704 | 12/1993 | D21C 11/12 |
| WO | WO9324704 | 12/1993 | D21C 11/12 |

OTHER PUBLICATIONS

Official Action issued in corresponding U.S. Appl. No. 13/390,655 dated May 7, 2013 16 pgs.
International Search Report issued in corresponding PCT application No. PCT/EP2010/061753 dated Dec. 1, 2010 (6 pages).
Markus Ising: "Vergasung fester Biomasse-Bereits Stand der Technik?" May 16, 2000 pp. 1-19 (20 pages).
International Search Report issued in corresponding PCT application No. PCT/EP2010/061753 dated Dec. 1, 2010 (6 pgs).
Markus Ising: "Vergasung fester Biomasse-Bereits Stand der Technik?" May 16, 2000 pp. 1-19 (20 pgs).

* cited by examiner

METHOD AND DEVICE FOR CONVERTING THERMAL ENERGY FROM BIOMASS INTO MECHANICAL WORK

FIELD OF THE INVENTION

The invention concerns a method for converting thermal energy from biomass into mechanical work, and a device for converting thermal energy into mechanical work. The invention is described with reference to biomass but it is pointed out that the method according to the invention and the device according to the invention can also be used for other carbon-containing products.

BACKGROUND OF THE INVENTION

DE 100 39 246 C2 concerns a method for converting thermal energy into mechanical work, wherein a first and a second means for storing thermal energy are connected alternately in a turbine branch. The disadvantage here is the inadequate integration of the heat released in the various process steps and the formation of dust in the flue gasses which is removed for example by means of a cyclone.

SUMMARY OF THE INVENTION

The present invention is therefore based on the object of providing a method and a device for converting thermal energy from combustion or gasification of carbon-containing raw materials into mechanical work which has a high efficiency and a high level of function with improved integration of heat into the combustion process, and advantageously works avoiding dust in flue gasses. Furthermore a method is created which efficiently supplies the resulting energy to individual processes.

An essential point of the invention is that a method for converting thermal energy from carbon-containing raw materials into mechanical work with at least one first and one second device for storage and emission of thermal energy, which are connected at least alternately in a turbine branch with a downstream gas turbine, comprises the following steps:

a) combustion of a fuel in a gas burner, combustion air being supplied to the gas burner,
b) passage of the flue gasses generated in the gas burner through a device for storing thermal energy, and
c) introduction of the hot air emitted by the at least one device for storage and emission of thermal energy into the gas turbine, in particular its expander, wherein hot air emitted by the gas turbine is supplied to at least one heat exchanger connected downstream of the gas turbine and by means of this heat exchanger the combustion air supplied to the gas burner is heated.

The term downstream means in particular downstream in relation to the gasses to be processed or the heat flow. Here the gas burner is advantageously connected immediately after a gasifier. Preferably the device for storing thermal energy is also suitable for emitting the stored thermal energy, for example in the form of hot air. Devices for storing thermal energy can in particular be bulk material generators as described for example in EP 0 620 909 B1 or DE 42 36 619 C2. The disclosure content of DE 100 39 246 A1 registered with the DPMA on Nov. 8, 2008 is included in full in the present disclosure by reference.

By the procedure according to the invention, the power yield of the plant can be increased by application of a more targeted lambda control of the system.

Thus it is proposed according to the invention to heat the combustion air for the gas burner by means of a heat exchanger, advantageously using the heat or hot air emitted by the gas turbine. In addition compressed air can be supplied to the heat exchanger. The method allows thus optimum heat integration into the combustion process. Also the heat formed on combustion is supplied by means of the heat exchanger back to the gas burner as a heated combustion air to further increase the efficiency of the method.

Preferably the hot air emitted by the gas turbine and supplied at least to one heat exchanger connected downstream of the expander of the gas turbine is at least partially supplied to a further heat exchanger as hot exhaust air and the thermal energy obtained coupled out as usable heat. This further increases the environmental friendliness and the efficiency of the method.

Preferably the hot air emitted by the gas turbine and supplied to at least one heat exchanger connected downstream of the gas turbine is supplied at least partly as hot exhaust air to at least one further heat exchanger and the resulting thermal energy used to generate saturated steam. In this embodiment the waste heat is used to generate saturated steam. This applies in particular to guiding the waste heat to at least one further heat exchanger which in turn is connected downstream of the heat exchanger connected downstream of the gas turbine which heats water to generate saturated steam.

In addition or alternatively, preferably the hot air emitted by the gas turbine and supplied to at least one heat exchanger downstream of the gas turbine is supplied at least partly as hot exhaust air to at least one further heat exchanger and the thermal energy obtained used to generate hot air. This hot air can be supplied to a gasifier.

The entire method preferably comprises in a first step gasification of the carbon-containing raw materials in a gasifier, wherein the product gas is supplied as fuel to the gas burner connected downstream of the gasifier. Here preferably the heated saturated steam and/or the hot air is introduced into a gasifier via the heat exchanger connected downstream of the gas turbine and used as a gasification medium for gasification.

Preferably as a gasifier a solid bed, counter-flow gasifier is used. Here the water vapour heated by means of a heat exchanger is introduced into the gasifier and used for gasification. Together with the water vapour advantageously a further gaseous medium is supplied to the gasifier as a combustion gas. Suitable combustion gas is e.g. hot air, oxygen, air enriched with oxygen and similar. In principle various gasifier types according to the prior art can be used. The particular advantage of a counter-flow, solid bed gasifier however is that within this reactor individual zones are formed in which different temperatures and hence different processes occur. The different temperatures are due to the fact that the respective processes are strongly endothermic and the heat is supplied only from below. In this way the very high seam temperatures are utilised particularly advantageously.

In a further preferred method by means of a gas turbine expanded hot air which has been released from the gas turbine is used to generate energy. Here this steam turbine can be incorporated in a separate water circuit and the water in this circuit vaporised by a heat exchanger and superheated. After the steam turbine, the steam is condensed in order then to be pressurised in liquid form by a pump before being supplied again to the heat exchanger.

The device according to the invention for conversion of thermal energy into mechanical work essentially comprises a gas burner for burning a fuel, at least one first and one second device for storing thermal energy which can be connected at least part of the time alternately in a turbine branch with a downstream gas turbine, and at least one connecting line which supplies flue gasses produced in the gas burner to devices for storing thermal energy, wherein at least one heat exchanger is connected downstream of the gas turbine and serves to heat combustion air guided into the gas burner.

In particular a connecting line is provided between the gas turbine and the heat exchanger and between the heat exchanger and the gas burner so that heat emerging from the gas turbine first heats the combustion air and thus the emitted energy can be resupplied to the gas burner, in order to structure the combustion process in the gas burner more efficiently. Preferably the device has an air supply device which supplies air, in particular fresh air, to the gas burner. Said heat exchanger is arranged in this line.

Preferably there is no direct gas connection between the gas turbine and the gas burner. By means of the heat exchanger however thermal energy from the gasses emitted by the gas turbine is transmitted to other media such as the combustion air, saturated steam and hot air, and these media are supplied to the gas burner and/or gasifier again as stated above.

Furthermore the gas turbine advantageously also acts as a compressor to compress the supplied air and to supply cold air to be heated again to the device for storing thermal energy, wherein at least one heat exchanger is connected downstream of the gas turbine and supplies the heated air to the gas burner.

Preferably a gasifier for generating or converting the fuel is connected upstream of the gas burner.

Further means for heating at least one gas are preferably connected downstream of the turbine branch. These means are for example also heat exchangers which at the same time can heat air to generate hot air which can be supplied to the gasifier. Furthermore these means can generate saturated steam which can also be supplied to the gasifier.

Preferably hot air supplied to at least one heat exchanger connected downstream of the gas turbine air is provided at least partly as hot exhaust air to at least one further heat exchanger and the thermal energy obtained coupled out as usable heat.

Preferably hot air supplied to at least one heat exchanger connected downstream of the gas turbine air is provided at least partly as hot exhaust air to at least one further heat exchanger which uses the thermal energy obtained to generate saturated steam.

Preferably hot air supplied to at least one heat exchanger connected downstream of the gas turbine air is provided at least partly as hot exhaust air to at least one further heat exchanger which uses the thermal energy obtained to generate hot air. Thus preferably several heat exchangers are successively arranged in a line behind the hot air emerging from the turbine.

Here preferably a means is provided for alternate connection in a turbine branch of at least one first device for storing thermal energy and at least one second device for storing thermal energy. These means for alternate connection can for example be a multiplicity of controllable valves which each allow alternate supply of flue gas to the means for storing thermal energy or alternate emission of heated air to the gas turbine.

Advantageously at least one further heat exchanger connected downstream of the compressor of the gas turbine is provided, which provides the hot air supplied at least partly cooled and as cold air to the first and/or second device for storing thermal energy. Firstly this guarantees an increase in efficiency of the stored energy.

Secondly cooling the air also reduces the temperature of the flue gas.

Further preferably a water injector is connected downstream of the gas turbine compressor.

Preferably at least one valve-like means is provided between the compressor and an expander of the gas turbine for disconnecting the turbine branch. The valve-like means serves as emergency shutoff and is preferably arranged in a bypass between a line leading to the pressure relief unit and a line leading away from the compressor of the gas turbine.

Furthermore temperature sensors can be provided which measure the temperatures at corresponding points of the devices for storing thermal energy and switch the corresponding valves in response to these measurements so as to allow optimum supply to the gas turbines at all times and furthermore an efficient recharging of the means for storing thermal energy. An essential advantage of controlling the combustion or gasification process by means of the arrangement of heat exchangers shown lies in particular in a highly targeted lambda control of the gas burner.

In a further advantageous embodiment a steam turbine is connected downstream of the gas turbine. This downstream steam turbine can re-use the hot air from the first gas turbine to generate power. Thus the current yield is improved further.

Advantages and suitable uses of the device are explained in the description below in conjunction with the drawings. These show:

FIG. 1 a first flow diagram, and

Figure 2:
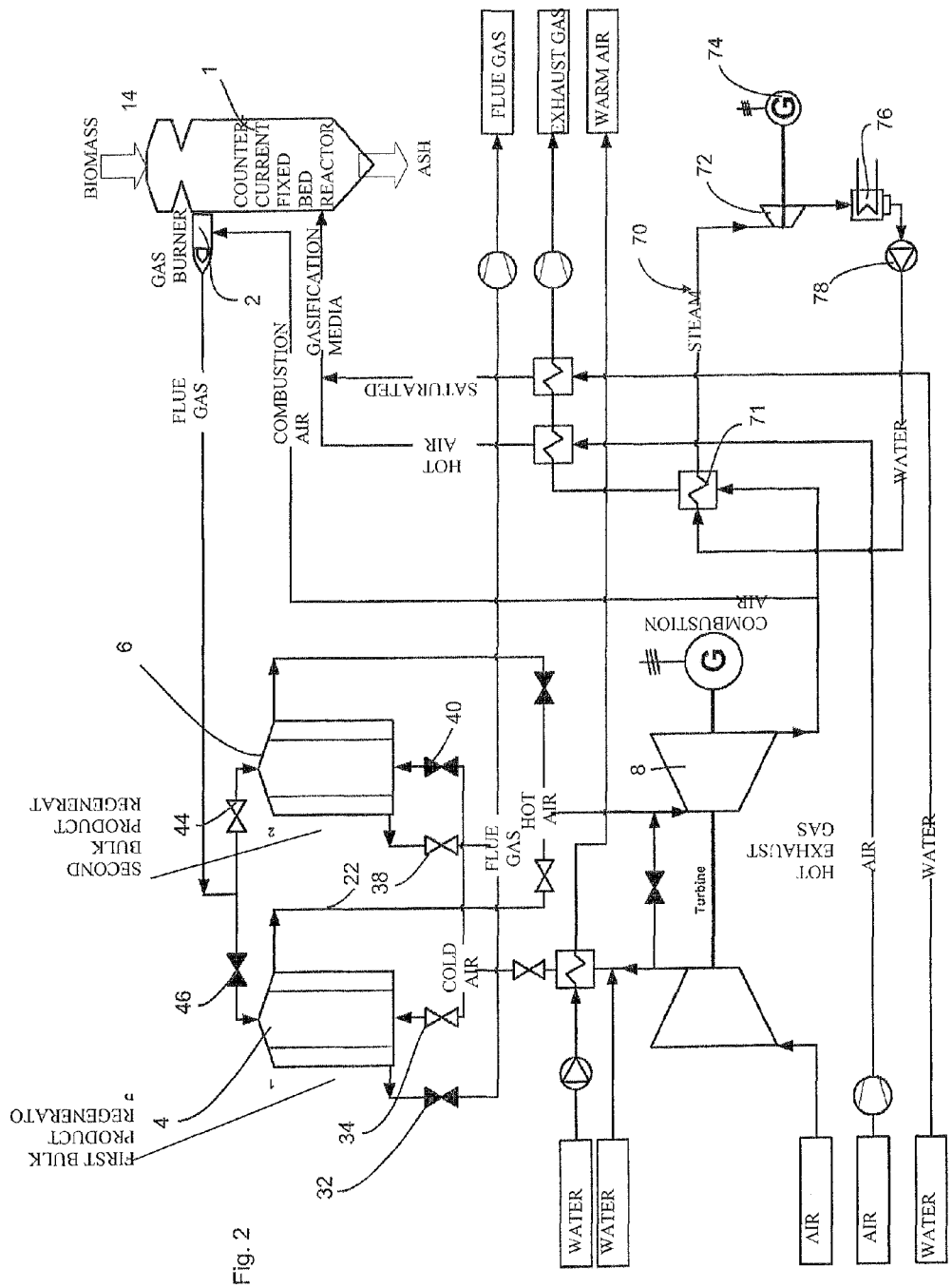

FIG. 2 a second flow diagram

FIG. 1 shows a diagrammatic flow diagram of the use of a device according to the invention for converting thermal energy from carbon-containing raw materials into mechanical work.

Here reference numeral 1 relates to a heat exchanger connected downstream of the gas turbine 8.

First the raw material 14 is introduced into the gasifier 18 from above and the gasification medium (e.g. air/saturated steam) is supplied along a line 16 from below. This achieves that the gasification medium and product gas flow through the reaction chamber in the opposite direction to the fuel flow. The ash produced in the gasifier 18 is discharged downwards i.e. along arrow P1.

The product gas enters the gas burner 2 and is burned. Then the flue gasses produced in the gas burner 2 are guided through a connecting line 3 and via valves 46, 44 to a first 4 or second 6 bulk product regenerator, and the hot air 7 emitted by the bulk product regenerator 4, 6 is supplied via a line 21 to a gas turbine 8. In the turbine branch T is arranged a generator G on the gas turbine 8. Reference numeral 23 designates a discharge line for discharging the flue gas occurring in the first means 4, 6 for storing thermal energy. A line 22 leads from the first regenerator 4 to the gas turbine 8.

The hot exhaust air emerging from the gas turbine 8 is supplied via a line 26 to the heat exchanger 1. The emitted heat is used to heat incoming compressed air which is supplied to the gas burner 2 as preheated combustion air 7.

The hot exhaust air emerging from the gas turbine 8 is then supplied to a further heat exchanger 13 which serves to generate hot water.

Heat exchangers 11, 12 are connected downstream of heat exchanger 13 to supply both heated air and water as gasification media to the solid bed, counter-flow reactor 18.

Heat exchanger 13 is connected immediately downstream of the first heat exchanger 1. By means of this device it is possible to use the heat discharged, for example to generate hot water at a high temperature. The heat exchangers 11, 12 for heating air and water as gasification media are connected downstream of the heat exchanger 13.

The series of heat exchangers allows a precise control of heat distribution in the method according to the invention. The first heat exchanger 1 which receives the combustion air with the highest temperature serves in particular to generate hot air for the gas burner, the next heat exchanger 13 serves to generate heat which is supplied to the further heat exchangers 11 and 12 in order then to generate hot air or saturated steam. Furthermore it would also be possible to change the order of the two heat exchangers 12 and 11.

The heat exchanger 15 is connected downstream of the compressor of the gas turbine 8 and cools the compressed hot air emerging from the compressor of the gas turbine 8 and then guides cold air to the first device 4 and/or second device 6 for storing thermal energy. This increases the temperature efficiency of the stored energy but reduces the temperature of the flue gas.

Reference numeral 58 in the figure refers to a pump for delivering water. Reference numeral 10 in the figure refers to hot air and reference numeral 9 to saturated steam.

Reference numerals 32, 34, 36, 38, 40, 42, 44, 46 each refer to controllable valves which control the supply of flue gas to the bulk product regenerators 4, 6 (valves 44 and 46) and the output of hot air from bulk product regenerators 4, 6 to the gas turbine 8 (valves 36 and 42), the output of flue gas (valves 32 and 38) and conversely the supply of cold air (valves 34 and 40) to the bulk product regenerators 4, 6. The valves drawn in black are in open state and the valves merely outlined are in closed state. Reference numerals 52, 54, 56 refer to compressors to compress or deliver air (numeral 56), flue gas (numeral 52) and exhaust air (numeral 54). Furthermore air is supplied to the gas turbine 8 via line 25 and guided over a further heat exchanger 15 in order to be supplied as cold air to the bulk product regenerators 4 and 6.

By use of the gasifier 18, advantageously the costly dust extraction from the flue gas 3 can be omitted.

FIG. 2 shows a further embodiment of the present invention. In this embodiment a further circuit 70 is provided which is connected downstream of the gas turbine 8. More precisely the hot air from the gas turbine 8 is guided through a heat exchanger 71 which is integrated in this circuit 70. The heat exchanger heats the water of the circuit 70 and supplies this to a steam turbine 72 which in turn drives the generator 74. Reference numeral 78 refers to a pump and numeral 76 to a condenser. With this procedure the current yield of the plant can be increased further.

All features disclosed in the application documents are claimed as essential to the invention where novel individually or in combination in relation to the prior art.

REFERENCE NUMERAL LIST

1 Heat exchanger connected downstream of gas turbine
2 Gas burner
3 Flue gasses, connecting line
4 First device for storage and output of thermal energy
6 Second device for storage and output of thermal energy
7 Combustion air, connecting line
8 Gas turbine
9 Saturated steam
10 Hot air
11, 12, 13, 15 Heat exchangers
14 Carbon-containing raw material
16 Supply line for gasification medium
18 Gasifier
21, 22 Supply line to gas turbine
25 Line
26 Supply line to heat exchangers
32, 34, 36, 38, 40, 42, 44, 46 Controllable valves
52, 54, 56 Compressors
58 Pump
60 Generator
61 Water injector
70 Circuit
71 Heat exchanger
72 Steam turbine
74 Generator
76 Condenser
P1 Direction arrow
T Turbine branch

The invention claimed is:

1. A device for converting thermal energy into mechanical work, comprising:
a gasifier for gasifying a carbon-containing raw material into a product gas; a gas burner for burning the product gas; at least one first device and at least one second device for storage and output of thermal energy, wherein said at least one first device and said at least one second device are alternatively connected in a turbine branch (T) with downstream gas turbine, and at least one connecting line which supplies flue gasses generated in the gas burner to the first and second devices for storing thermal energy, wherein at least one heat exchanger is connected downstream of the gas turbine and serves to heat the combustion air supplied to the gas burner.

2. The device according to claim 1, wherein the gasifier for generating product gas as a fuel for the gas burner is connected upstream of the gas burner.

3. The device according to claim 2, further comprising downstream of the compressor of the gas turbine at least one further heat exchanger which at least partly cools the supplied hot air and supplies this as cold air to the first device for storing thermal energy.

4. The device according to claim 1, further comprising a heater for heating at least one gas are connected downstream of the turbine branch (T).

5. The device according to claim 1, wherein hot air supplied to at least one heat exchanger connected downstream of the gas turbine is supplied at least partly as hot exhaust air to at least one second heat exchanger and the thermal energy obtained is taken out as usable heat.

6. The device according to claim 1, wherein hot air supplied to at least one heat exchanger connected downstream of the gas turbine is supplied at least partly as hot exhaust air to at least one second exchanger which uses the thermal energy obtained to generate saturated steam.

7. The device according to claim 1, wherein hot air supplied to at least one heat exchanger connected downstream of the gas turbine is supplied at least partly as hot exhaust air to at least one second heat exchanger which uses the thermal energy obtained to generate hot air.

8. The device according to claim 1, wherein a connector for alternate connection of at least one first device for storing thermal energy and at least one second device for storing thermal energy is provided in the turbine branch (T).

9. The device according to claim 1, further comprising downstream of the compressor of the gas turbine a water injector.

10. The device according to claim 1, further comprising at least one valve between the compressor and a pressure relief unit of the gas turbine for disconnecting the turbine branch (T).

11. The device according to claim 1, wherein a steam process is connected downstream of the gas turbine.

12. A method for converting thermal energy from carbon-containing raw material into mechanical work with at least one first device and at least one second device for storage and output of thermal energy, wherein said first device and said second device are alternatively connected in a turbine branch (T) with a downstream gas turbine as claimed in claim 1, comprising the following steps:
 a) gasification of a carbon-containing raw material using the gasifier into a product gas,
 b) supply of the product gas as fuel to the gas burner connected downstream of the gasifier,
 c) combustion of the product gas in the gas burner, wherein combustion air is supplied to the gas burner,
 d) passage of the flue gasses produced in the gas burner through a device for storing thermal energy, and
 e) introduction of the hot air output from at least one of the first and the second devices into the gas turbine, wherein hot air emitted by the gas turbine is supplied to the at least one heat exchanger, and using the heat exchanger to heat the combustion air supplied to the gas burner.

13. The method according to claim 12, wherein the hot air emitted by the gas turbine and supplied to at least one heat exchanger connected downstream of the gas turbine is supplied at least partly as hot exhaust air to at least one second heat exchanger and the thermal energy obtained is coupled out as usable heat.

14. The method according to claim 12, wherein the hot air emitted by the gas turbine and supplied to at least one heat exchanger connected downstream of the gas turbine is supplied at least partly as hot exhaust air to at least one second heat exchanger and the thermal energy obtained is used to generate saturated steam.

15. The method according to claim 12, wherein the hot air emitted by the gas turbine and supplied to at least one heat exchanger connected downstream of the gas turbine is supplied at least partly as hot exhaust air to at least one second heat exchanger and the thermal energy obtained is used to generate hot air.

16. The method according to claim 12, wherein the gasifier comprises a solid bed counter-flow gasifier is used.

17. The method according to claim 12, wherein hot air released using a steam turbine from the gas turbine is used for energy production.

* * * * *

UNITED STATES PATENT AND TRADEMARK OFFICE
CERTIFICATE OF CORRECTION

| | | |
|---|---|---|
| PATENT NO. | : 8,561,412 B2 | Page 1 of 1 |
| APPLICATION NO. | : 13/390487 | |
| DATED | : October 22, 2013 | |
| INVENTOR(S) | : Dragan Stevanovic | |

It is certified that error appears in the above-identified patent and that said Letters Patent is hereby corrected as shown below:

In the Drawings

Fig. 2, "FIRST BULK PRODUCT REGENERATO" should be --FIRST BULK PRODUCT REGENERATOR-- and "SECOND BULK PRODUCT REGENERAT" should be --SECOND BULK PRODUCT REGENERATOR--.

In the Claims

Claim 16, Col. 8, line 17, "claim 12" should be --claim 15--.

Claim 16, Col. 8, line 18, delete "is used".

Signed and Sealed this
Fourteenth Day of October, 2014

Michelle K. Lee
*Deputy Director of the United States Patent and Trademark Office*